UNITED STATES PATENT OFFICE.

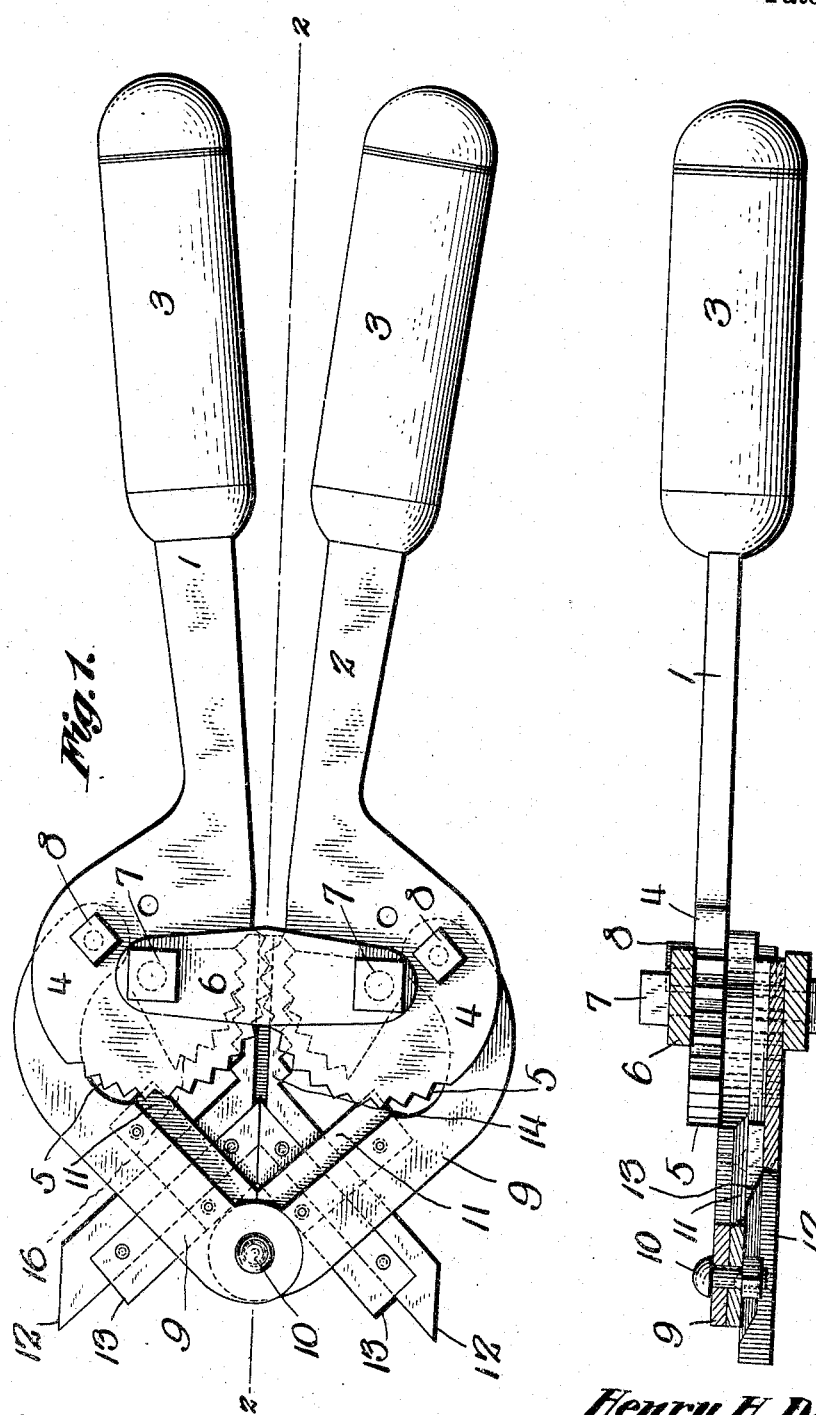

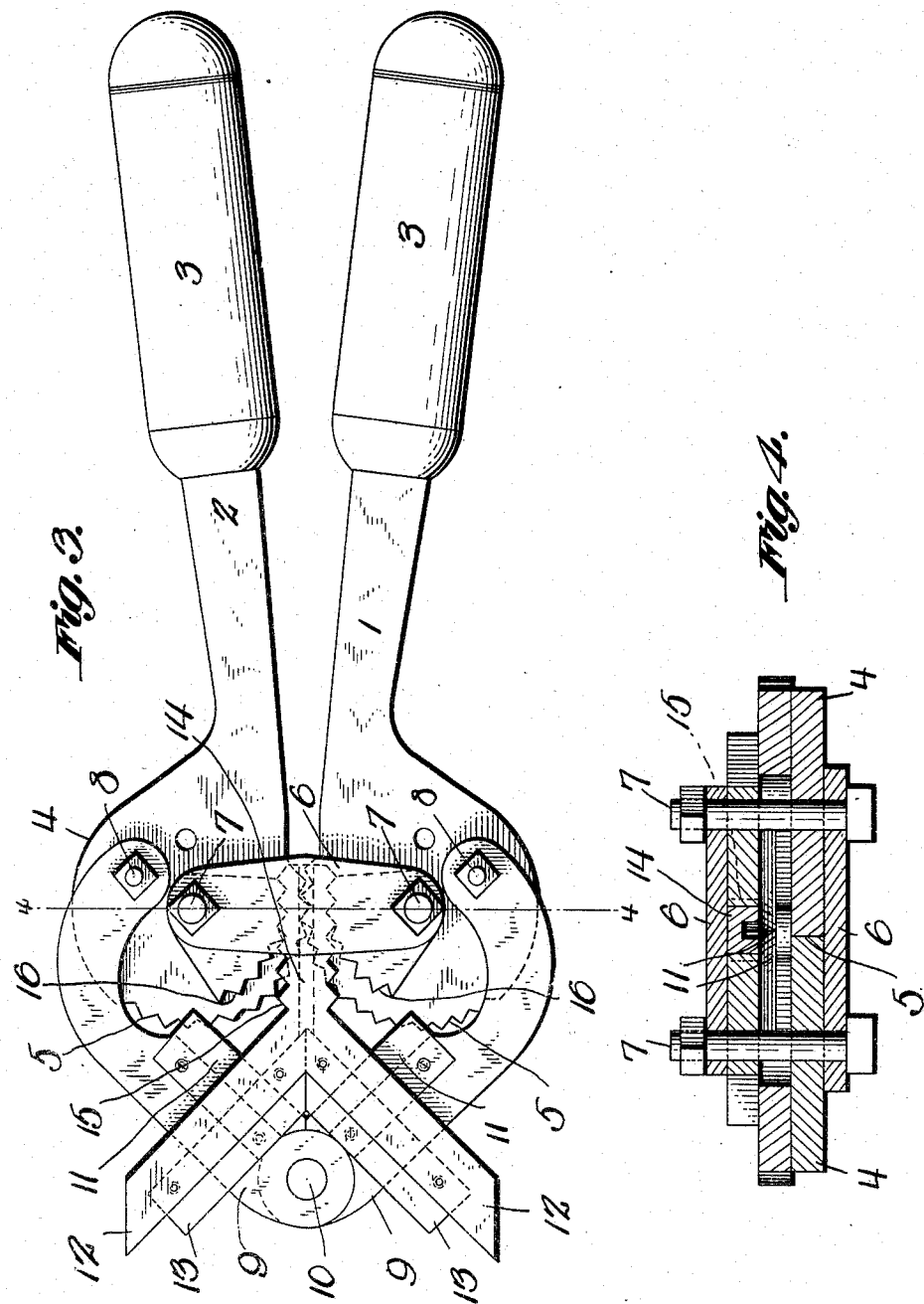

HENRY H. DANIELSON, OF LOGAN, UTAH.

DEHORNER.

947,097.  Specification of Letters Patent.  Patented Jan. 18, 1910.

Application filed June 11, 1909. Serial No. 501,584.

*To all whom it may concern:*

Be it known that I, HENRY H. DANIELSON, a citizen of the United States, residing at Logan, in the county of Cache and State of Utah, have invented new and useful Improvements in Dehorners, of which the following is a specification.

This invention relates to dehorning implements, and the primary object of the invention is to provide a device of this character wherein a combined shearing and gliding motion is imparted to the blades so that the device may operate quickly, easily and effectively.

With the above, and other objects in view, which will appear as the description progresses the invention resides in the novel construction and combination of parts hereinafter fully described and claimed.

In the accompanying drawings there has been illustrated a simple and preferred embodiment of the invention and in which:

Figure 1 is a top plan view of the apparatus. Fig. 2 is a longitudinal sectional view upon the line 2—2 Fig. 1. Fig. 3 is a bottom plan view of the device. Fig. 4 is a transverse sectional view upon the line 4—4 Fig. 3.

In the accompanying drawings the numerals 1 and 2 designate the arms of the device. These arms 1 and 2 have their outer extremities provided with suitable handles 3, while their inner faces are enlarged and are of a curved or arcuate formation as designated by the numeral 4. The outer edges of these enlarged faces 4 are each provided with a plurality of spaced teeth 5 and the teeth 5 of one of the members are adapted to engage with the teeth of the opposite member, so that when the members are swung away from each other they are each sustained at an equal distance from the central point of the device. These enlargements or heads 4 are provided upon both of their faces with a suitable link 6, and these links are connected together through the medium of suitable bolts or analogous devices 7.

By reference to Figs. 1 and 3 of the drawings it will be noted that the heads 4 are each provided with a plurality of openings whereby the members 7 may be adjustably connected with said heads and whereby the length of the stroke of a cutting blade, hereinafter to be described, may be regulated.

Pivotally connected, as at 8, with each of the heads 4 are a pair of angularly disposed members 9. These members 9 have their free ends pivotally connected as designated by the numeral 10, and each of these members are provided with suitable pockets adapted for the reception of knife or cutting elements 11. By this arrangement it will be noted that when the handles 3 are swung apart the knives 11 are forced toward the heads 4 of the arms 1, thus producing a gliding or shearing movement to the knives.

The numeral 12 designates the sliding member of the device. This member 12 has its outer portion of a substantially V-shaped formation and each of the arms provided by these diverging members is provided with a knife blade 13. The V-shaped member 12 is also provided with a rearwardly extending shank 14. This shank 14 has each of its longitudinal edges provided with spaced teeth 15 which are adapted to lie adjacent one of the sides of the heads 4 of the members 1. Secured upon these heads 4 through the medium of the members 7 and the link 6 are a pair of toothed segments 16 and the teeth of these segments are adapted to engage with the teeth of the extension 14.

In operating the device it will be noted that it is merely necessary to spread the handles 3 away from each other in order to retract the member 12, through the medium of the toothed segments 16 and this movement also causes the arms 9 to spread and to be supported a suitable distance away from the knives 13. The device is then positioned upon the horn of the animal to be operated upon, the handles 3 are brought together, causing the knife blades 11 to perform a shearing motion upon one side of the horn of the animal and the traveling V-shaped member 12 to glide forwardly upon the opposite side of the horn to be severed, thus easily and quickly dehorning the animal.

From the above description, taken in connection with the accompanying drawings, it will be noted that I have provided a comparatively simple, cheap and effective device for the purpose intended, one which may be easily and quickly operated and one which provides a shearing as well as a gliding movement of the knives so as to dehorn an animal with the least expenditure of physical exertion, and it is to be understood that while I have illustrated and described the preferred embodiment of the improvement, minor details of construction within the scope of the following claims may be resorted to if desired.

What I claim as new is:—

1. In combination with a pair of handles pivotally connected together, arms provided with inner cutting edges pivoted to the handle members, said arms having their free ends pivotally connected together, and a gliding member having a V-shaped head provided with inner sharpened edges adapted to be moved toward or away from the cutting arms as the handles are swung in either direction.

2. In a device for the purpose set forth, a pair of handles having enlarged ends provided with meshing teeth, a pivoted connection between the handles, an arm having an inner cutting edge pivotally connected with each of the handles, said arms having their free ends pivotally connected together, and a gliding element provided with a V-shaped head having inner cutting edges positioned upon the handle members and adapted to be forced in the direction of the cutting arms carried by the handles when said handles are moved in one direction.

3. In a device for the purpose set forth, a pair of handles having enlarged ends provided with intermeshing teeth, a pivotal connection between the arms, a pair of centrally pivoted cutting members pivotally connected with each of the enlarged heads of the handle members, said cutting members being provided with pockets, removable blades within the pockets, the heads being also provided with two segments, a V-shaped member having an extension provided with teeth adapted to engage with the teeth of the segments, said V-shaped member being provided with pockets, and removable cutting members for the pockets of the V-shaped member.

In testimony whereof I affix my signature in presence of two witnesses.

HENRY H. DANIELSON.

Witnesses:
J. Z. STEWART,
J. Y. PETRITSCH.